United States Patent Office 2,733,267
Patented Jan. 31, 1956

2,733,267

SYNTHETIC DRYING OILS

Donald F. Koenecke, Westfield, N. J., assignor to Esso Research and Engineering Company, a corporation of Delaware No Drawing. Application August 11, 1954,
Serial No. 449,277

9 Claims. (Cl. 260—534)

This invention relates to an improvement in the drying properties of liquid diolefin polymers and more particularly relates to the drying of baked films.

It is known to prepare synthetic drying oils by polymerizing conjugated diolefins, such as butadiene, isoprene, piperylene, etc., or copolymerizing such diolefins with vinyl aromatics such as styrene, etc. The process is carried out in the presence of catalysts such as sodium, peroxides and the like. Thus, oils are prepared which, when dissolved in an equal quantity of hydrocarbon solvent such as mineral spirits, generally have a viscosity between about 0.1 and 20 poises, or about 400 to 20,000 poises when diluent-free.

The oils thus obtained are particularly useful as protective coatings in the form of colorless varnishes or enamels and may be either air-dried or baked. However, it has been found by experience that the coatings, particularly the baked films, have a tendency to dry on the surface. When thicker films of the varnish or enamel are applied to metal to be cured by baking, the surface dries, sealing off the lower portion of the film thus retarding oxidation and curing with the result that a tack-free surface covering a soft substrate is obtained. The soft portion makes the film subject to marring and abrasion without appreciable force being applied. These disadvantages have restricted the application of these synthetic drying oils to films of about one mil (0.001 inch) or less in thickness. Since many uses such as appliance finishes and primer surfaces require films of 1.5 mils or greater, it is obvious that there are many applications in which these oils are not suitable.

It is known, in accordance with the teachings of U. S. 2,652,342, that the pigment-wetting properties of the synthetic hydrocarbon drying oils can be improved by reacting the oil at 50 to 250° C. with .01 to 2.5% maleic anhydride, chloro-maleic anhydride, or citraconic anhydride. However, this treatment has little, if any, effect on the drying properties of the oil films.

In copending application 439,492 of D. F. Koenecke et al., filed June 25, 1954, the film-hardness of a polymer drying oil is increased by first reacting the oil with maleic anhydride or similar reagent as described in the above patent and then reacting this product with an organic compound containing at least two functional groups, one of which is a primary or secondary amine and one of which is a hydroxyl group, such as 2-amino-2-methyl propane diol-1,3 and 2-amino-2 (hydroxymethyl) propane diol,1,3.

In accordance with the present invention, it has been found that the film-hardness can be further increased by further treating the reaction product of the maleic anhydride-treated polymer oil with the organic compound described in copending application 439,492 with a suitable curing aid. This enables even thicker films to be used thus expanding the utility of the product.

The synthetic oils to be treated in accordance with the present invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g. with 5 to 40% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Suitable polymerization procedures are illustrated below in Runs A and B. Throughout the present description it will be understood that all proportions are expressed on a weight basis unless otherwise specified.

*Run A.*—For example, 100 parts of butadiene-1,3, 50 parts of straight run mineral spirits boiling between 150 and 200° C. (Varsol), 3 parts of t-butyl hydroperoxide (60% pure) and 0.75 parts of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. Patent 2,586,594 of Arundale et al., issued on February 19, 1952, which describes alternative monomers, catalysts, reaction diluents, polymerization modifiers, suitable ranges of proportions of the various ingredients, suitable ranges of polymerization conditions, etc.

*Run B.*—An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 parts of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or the like and filtered. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 20,000, preferably between about 3,000 to 10,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having more than 2 carbon atoms such as methyl ethyl ether, or the modifier may be omitted altogether, especially when it is not essential to obtain a perfectly colorless product. Similarly, isopropanol is not necessary, though aliphatic alcohols generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 200° C., e. g. butane, benzene, xylene, cyclohexane and the like. The diluents are usually used in amounts ranging from 50 to 500 parts per 100 parts of monomer. The reaction temperature may vary between about 40° C. and 105° C., preferably around 65 to 85° C. As a catalyst, 0.1 to 10 parts of dispersed metallic sodium is used per 100 parts of monomers, sodium particle sized below 100 microns being particularly effective.

The first material to be reacted with the liquid polymer drying oil includes any unsaturated organic compound having a carboxyl group or anhydride or ester thereof, e. g. maleic acid, fumaric acid, thioglycollic acid, thiosalicylic, mercaptophthalic acid, itaconic acid, mesaconic acid, citraconic acid, acrylic acid, their anhydrides or esters. While these reagents may be added in any amount up to incipient gelation, amounts between 0.01% and 15% are generally suitable. The reaction is carried out at a temperature between 50 and 250° C., preferably between 180 and 220° C. The necessary time for such treatment varies between about 15 minutes and two hours depending on the temperature employed.

Materials suitable for reacting with the above-treated oils are those compounds having at least two, preferably three functional groups. It is essential that one of these groups be a primary or secondary amine and another be a hydroxyl group. Any number of hydroxyl groups may be present as well as other substituents. A particularly desirable class of compounds suitable for reacting with the treated oils are monoprimary and monosecondary amino alcohols, the carbon structure of which is aliphatic, aromatic or aliphatic-aromatic and which may contain oxygen and sulfur in the skeleton. Suitable compounds include ethanolamine; diethanolamine; 2-amino-2-methylpropane diol-1,3; 2-amino-2 (hydroxymethyl) propane diol-1,3; aminobenzyl alcohol; aminoxylyl alcohol; aminodiethylene glycol; and the like. The reaction is carried out at temperatures between 20 and 250° C. Any amount of the above compounds can be used from about 0.1 up to about one mole per mole of available COOH or equivalent groups on the treated oil.

The accelerators or curing aids to be used in reacting the maleic anhydride-treated polymer oil with the amino alcohols and the like are hydrocarbon soluble acids rather strong in acidity such as mono-, di- and tri-chloroacetic acid, trifluoroacetic acid, glacial acetic acid and soluble sulfonic acids, e. g. a $C_{12}$–$C_{18}$ alkylated benzene sulfonic acid. Since the acids tend to corrode ferrous metals, it is necessary that the acid be added in amounts no greater than are equivalent to the alcohol group. Thus the acids are added in amounts from 0.1 to 1 mole per mole of available (OH) groups. When so added the hardness of the film is increased from a Sward hardness of about 7 to about 18 in films 1.95 to 2 mils thick after baking 30 minutes at 320–325° F.

While it is not desired to limit the invention by any theory of the reactions involved, it is believed that the following represents the course of the reactions involved:

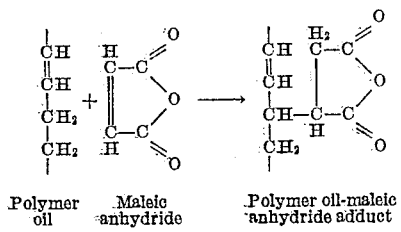

Polymer   Maleic   Polymer oil-maleic
oil   anhydride   anhydride adduct

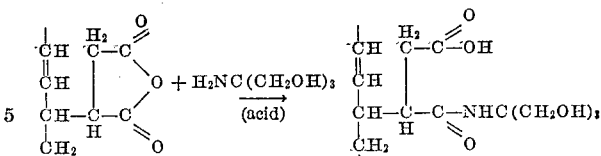

Polymer oil-   2-amino-2 (hydroxy-
maleic anhydride   methyl) propane
adduct   diol-1,3

Thus in the first step the polymer oil adds to the maleic anhydride to form the adduct which is then reacted with the amine to form an amide and a free acid group. In the presence of additional amounts of the polyol, the amine salt of the acid also forms at lower temperatures. At temperatures above 100° C. the salt may be more slowly dehydrated to the diamide. Thus a considerable number of hydroxymethyl groups can be added by means of stable amide groups. The polymer thus treated contains controlled amounts of polar groups which are also subject to oxidation, polymerization, esterification, and acetal and ketal formation in the process of film formation with the result that films are obtained with greatly increased hardness.

The following specific examples are presented to illustrate typical applications and effects of the present invention. All quantities are expressed in this specification and claims on a weight basis unless stated otherwise.

*Example 1*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150 to 200° C.; solvent power, 33–37 kauri-butanol value (reference scale: benzene—100 K. B. value, n-heptane 25.4 K. B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% non-volatile matter as described in earlier parts of this specification. The resulting product had a viscosity of 1.5 poise at 50% N. V. M. and the non-volatile portion thereof had an average molecular weight of about 3,000. The finished oil was subjected to an after treatment which consisted in refluxing the oil at 175° C. for two hours in the presence of 1.0% maleic anhydride. The resulting oil was then poured on thin steel panels to form coatings of 1.65 mils and baked for 30 minutes at 325° F. The oil proved to be rather slow drying and found to have a Sward hardness value of 5–8 (Glass-100).

*Example 2*

80 g. of polymer oil of Example 1 at 50% non-volatile content in Varsol was mixed with 1.0 g. of 2,amino-2(hydroxymethyl) propane diol-1,3. The mixture was heated to 330° F. for 10 minutes for reaction and solubility. Upon cooling the Varsol was replaced to restore the non-volatile content to 50%. The viscosity increased considerably and 2 vol. percent n-butanol were added to help reduce the increase.

To this mixture 1% trichloracetic acid ($Cl_3CCOOH$) was added as a 16% solution in xylene. The mixture was agitated for uniform dispersion or solution.

Films were cast on steel panels and baked for 30 minutes at 325° F. The cured film hardness was measured with the Sward Rocker and reported as percent based on plate glass as 100. The following results were noted for various thicknesses.

|  | Thickness, mils | Hardness | Thickness, mils | Hardness | Thickness, mils | Hardness |
|---|---|---|---|---|---|---|
| Polymer oil (maleic anhydride treated) | 1.6 | 9 | 1.6 | 8 | 1.8 | 4 |
| Amino alcohol-modified | 1.62 | 17 | 1.75 | 12 | 2.05 | 6 |
| Acid-treated | 1.62 | 26 | 1.65 | 21 | 2.15 | 11 |

From these results it is obvious that the film hardness of the Example 1 is nearly three times that of the original polymer oil and from 50–100% higher than the amino alcohol-modified oil of the second step.

*Example 3*

The same oil used in Example 2 was treated with 1.1% diethanol amine. In this case, it was not necessary to heat. Solution and reaction occurred by mixing thoroughly the oil and the liquid amine.

This mixture was treated with 1% ($Cl_3CCOOH$) trichloracetic acid also added as a 16% solution in xylene.

The oils were used to make films on steel panels which were baked 30 minutes at 325° F. After curing the Sward hardness was observed. The results are listed below:

|  | Thickness, mils | Hardness | Thickness, mils | Hardness | Thickness, mils | Hardness |
|---|---|---|---|---|---|---|
| Polymer oil | 1.42 | 12 | 1.6 | 9 | 1.8 | 4 |
| Amino modified oil | 1.52 | 16 | 1.65 | 12 | 2.0 | 5 |
| Acid-treated modified oil | 1.50 | 32 | 1.75 | 26 | 1.95 | 8 |
| Acid-treated unmodified oil [1] | 1.4 | 2 | 1.58 | 2 |  | (²) |

[1] Maleic anhydride treated oil plus $Cl_3CCOOH$ without an amine alcohol modifier.
² Seedy, rough.

From the above two examples, it is apparent that the hardness of baked films is greatly improved by the embodiment of the invention described. Furthermore, it is essential to use the amino alcohol modified oil since otherwise the oil is rapidly degraded.

The nature of the present invention having been thus fully set forth and specific examples of the same given, what is claimed as new and useful and desired to be secured by Letters Patent is:

1. A process for improving the hardness of films prepared from polymeric drying oils which comprises first reacting the oil at a temperature between 50 and 250° C. with from 0.01% to an amount which will cause gelation of a reagent selected from the group consisting of maleic acid, fumaric acid, thioglycolic acid, thiosalicylic acid, mercaptophthalic acid, itaconic acid, mesaconic acid, citraconic acid, acrylic acid and the esters and anhydrides thereof, then reacting the resulting product with about 0.1 to about 1 mole per mole of available carboxyl groups of an organic compound containing at least two functional groups one of which is selected from the group consisting of primary and secondary amines and the other is a hydroxyl group, and finally treating the resulting product with an acid compound chosen from the group consisting of mono, di and trichloroacetic acid, trifluoroacetic acid, glacial acetic acid, and soluble sulfonic acids.

2. A process according to claim 1 in which the acid compound is trichloroacetic acid.

3. A process according to claim 2 in which the organic compound contains two hydroxyl groups.

4. A process according to claim 2 in which the organic compound is a monoprimary amino alcohol, the carbon structure of which is selected from the group consisting of aliphatic, aromatic, aliphatic-aromatic hydrocarbon structures and the same structures which contain oxygen and sulfur in the skeleton.

5. A process according to claim 2 in which the organic compound is a monosecondary amino alcohol, the carbon structure of which is selected from the group consisting of aliphatic, aromatic, aliphatic-aromatic hydrocarbon structures and the same structures which contain oxygen and sulfur in the skeleton.

6. A process according to claim 2 in which the organic compound is 2-amino-2-methyl propane diol-1,3.

7. A process according to claim 2 in which the organic compound is 2-amino-2 (hydroxymethyl) propane diol,-1,3.

8. A process according to claim 2 in which the organic compound is ethanolamine.

9. A process according to claim 2 in which the organic compound is diethanolamine.

References Cited in the file of this patent
UNITED STATES PATENTS

| 2,476,955 | Bloch | July 26, 1949 |
| 2,652,342 | Gleason | Sept. 15, 1953 |
| 2,683,162 | Gleason | July 6, 1954 |

FOREIGN PATENTS

| 485,883 | Great Britain | May 26, 1938 |